United States Patent
Kang et al.

(10) Patent No.: US 8,825,048 B2
(45) Date of Patent: Sep. 2, 2014

(54) METHOD AND APPARATUS FOR DETERMINING BASE STATION IDENTITY

(71) Applicant: QUALCOMM Incorporated, San Diego, CA (US)

(72) Inventors: Insung Kang, San Diego, CA (US); Qingxin Chen, Del Mar, CA (US); Shiau-He Tsai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/657,676

(22) Filed: Oct. 22, 2012

(65) Prior Publication Data

US 2014/0113655 A1    Apr. 24, 2014

(51) Int. Cl.
 *H04W 4/00*    (2009.01)
(52) U.S. Cl.
 USPC .......................................................... 455/434
(58) Field of Classification Search
 USPC .............. 455/432.1, 432.2, 434, 435.1, 456.1
 See application file for complete search history.

(56) References Cited

U.S. PATENT DOCUMENTS

| | | | |
|---|---|---|---|
| 6,181,682 B1* | 1/2001 | Abbadessa et al. | 370/328 |
| 7,689,235 B2* | 3/2010 | Demir et al. | 455/502 |
| 7,693,123 B2* | 4/2010 | Rudolf | 370/342 |
| 8,131,464 B2 | 3/2012 | Farmer et al. | |
| 8,385,961 B1* | 2/2013 | Christensen et al. | 455/513 |
| 2004/0104841 A1 | 6/2004 | Syrjarinne et al. | |
| 2004/0162072 A1* | 8/2004 | Sigle et al. | 455/436 |
| 2006/0129317 A1 | 6/2006 | Farmer et al. | |
| 2006/0276203 A1* | 12/2006 | Sambin | 455/456.1 |
| 2008/0285529 A1* | 11/2008 | Kwak et al. | 370/338 |
| 2009/0116470 A1* | 5/2009 | Berggren | 370/342 |
| 2009/0170508 A1* | 7/2009 | Han et al. | 455/434 |
| 2009/0323629 A1* | 12/2009 | Lindoff et al. | 370/330 |
| 2010/0048217 A1* | 2/2010 | Deshpande et al. | 455/446 |
| 2010/0062792 A1 | 3/2010 | Han et al. | |

(Continued)

FOREIGN PATENT DOCUMENTS

WO    WO-2009043215 A1    4/2009

OTHER PUBLICATIONS

Kunczier H. et al. "Enhanced cell iD based terminal location for urban area location based applications" Consumer comunicaitons and networking confernece, 2004, CCNC 2004 First IEEE Las Vegas, NV USA, Jan. 5, 2004, Piscataway, NJ pp. 595-599.

(Continued)

*Primary Examiner* — Christopher M Brandt
(74) *Attorney, Agent, or Firm* — Kilpatrick Townsend & Stockton LLP (57) ABSTRACT

Methods for improving the time to acquire an identity of a base station by a mobile station, by relying on locally-unique attributes of the base stations instead of globally-unique attributes of the base stations, are presented. In some embodiments, data may be requested, the data may contain a globally unique attribute of a base station, a first locally unique attribute of the base station, and a second locally unique attribute of the base station. In some embodiments, data may be received in response to the request, the data may contain at least the first locally unique attribute and the second locally unique attribute. It may then be determined that the data did not contain the globally unique attribute, and an identity of the base station based at least in part on the first locally unique attribute and the second locally unique attribute may be acquired.

32 Claims, 8 Drawing Sheets

(56) References Cited

U.S. PATENT DOCUMENTS

| | | | |
|---|---|---|---|
| 2010/0135257 A1* | 6/2010 | Higuchi et al. | 370/336 |
| 2010/0156706 A1* | 6/2010 | Farmer et al. | 342/357.1 |
| 2011/0070897 A1* | 3/2011 | Tang et al. | 455/456.1 |
| 2011/0105120 A1* | 5/2011 | Abdel-Samad et al. | 455/436 |
| 2011/0268022 A1 | 11/2011 | Xu | |
| 2012/0015649 A1* | 1/2012 | Li et al. | 455/434 |
| 2012/0051260 A1* | 3/2012 | Tamaki | 370/253 |
| 2012/0083241 A1 | 4/2012 | Annamalai et al. | |
| 2013/0143550 A1* | 6/2013 | Ostrup et al. | 455/424 |
| 2013/0203419 A1* | 8/2013 | Siomina et al. | 455/437 |

OTHER PUBLICATIONS

Ericsson: "UE measurements and reporting of Global Cell Identity", 3GPP Draft; R2-072674, 3RD Generation Partnership Project (3GPP), Mobile Competence Centre; 650, Route Des Lucioles; F-06921 Sophia-Antipolis Cedex; France, vol. Ran WG2, no. Orlando, USA; 20070622, Jun. 22, 2007, pp. 1-2.

International Search Report and Written Opinion—PCT/US2013/061644—ISA/EPO—Feb. 19, 2014.

* cited by examiner

| Information Element/Group name | Need | Multi | Type and Reference | Semantics description |
|---|---|---|---|---|
| Cell identity | MP | | bit string(28) | |

504

| Information Element/Group name | Need | Multi | Type and Reference | Semantics description |
|---|---|---|---|---|
| Cell parameter Id | MP | | Integer (0..127) | |

506

| Information Element/Group name | Need | Multi | Type and Reference | Semantics description |
|---|---|---|---|---|
| Primary Frequency | MP | | Integer (0..16383) | [22] |

METHOD AND APPARATUS FOR DETERMINING BASE STATION IDENTITY

BACKGROUND

Wireless communications systems traditionally rely on satellites within a line of sight in order to obtain a positioning and timing information. However, wireless communications systems may rely increasingly on terrestrial base stations in order to assist in acquiring information about the location of satellites or other timing information. Improving upon these techniques may relate to improving signal acquisition time of a satellite or base station, reducing the power consumed when acquiring these data, or improving the accuracy of identification of satellites or base stations. It may be desirable to create techniques or systems that improve on any or all of these characteristics.

SUMMARY

In embodiments of the invention, these aforementioned problems and other problems may be solved according to the disclosures provided herein.

Methods, apparatuses, systems and computer-readable media for improving the time to acquire an identity of a base station, by relying on locally-unique attributes of the base stations instead of globally-unique attributes of the base stations, are presented.

In some embodiments, data containing a globally unique attribute of a base station, a first locally unique attribute of the base station, and a second locally unique attribute of the base station may be requested. An example of a globally unique attribute of a base station may be a cell ID (CID) value of the base station. An example of a first and a second locally unique attribute may be a cell parameter ID (CPID) and a primary frequency (PF) value of the base station. Data may be received in response to the request, the data containing at least the first locally unique attribute and the second locally unique attribute. In some embodiments, it may be determined that the data did not contain the globally unique attribute, and then an identity of the base station based at least in part on the first locally unique attribute and the second locally unique attribute may be acquired.

In some embodiments, a database containing reference globally unique attributes and reference locally unique attributes may be maintained. Data in the database may be in the form of a "triplet," each triplet may contain a reference globally unique attribute and a first and second reference locally unique attribute. A first locally unique attribute and a second locally unique attribute may be compared to values in the database. These values may be associated with reference and/or local base stations.

In some embodiments, the database may be periodically purged, updated, and/or refreshed. Items in the database may be purged after having remained in the database a predetermined length of time. Items may be updated based on data received from base stations in geographic proximity to a device containing the database, such as a mobile station.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The term "globally unique attribute" may refer to an attribute, value, identifier or marker that is unique globally, in the sense that reference to a globally unique attribute unambiguously refers to only one entity in the entire world. Examples of globally unique attributes may include IP addresses for devices configured to access the Internet, Vehicle Identification Numbers (VINs) for vehicles, international telephone numbers and cell Identification (CID) values for terrestrial base stations.

The term "locally unique attribute" may refer to an attribute, value, identifier or marker that is unique locally, in the sense that there may be duplicates of the same locally unique attribute and thus reference to a locally unique attribute may identify only a local entity without ambiguity. Examples of a locally unique attribute may include street addresses, student ID numbers, city names, and cell parameter IDs (CPIDs) and primary frequency values of terrestrial base stations.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Time Division Synchronous Code Division Multiple Access (TD-SCDMA), Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An FDMA network may include Universal Mobile Telecommunications System—frequency-division duplexing (UMTS-FDD) and the like. An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

In some embodiments, the time to acquire an identity of local base stations may be improved, by relying on locally-unique attributes of the base stations instead of globally-unique attributes of the base stations. During high traffic volume, a mobile station may be unable to receive globally-unique attributes of a local base station, preventing the mobile station from identifying the local base station under conventional means. An exhaustive search for any base stations may then need to be performed under conventional means, but the signal acquisition time may be improved over performing an exhaustive search, by relying on locally-unique attributes of nearby base stations when globally-unique attributes have not been obtained.

Acquiring the identity of local base stations may be important for various reasons. For example, a mobile station may rely on local base stations for global positioning and timing information in the event that satellites are not sufficiently in view with the mobile station. As another example, local base stations may be used in cellphone communications. Acquiring the identity of local base stations quickly and efficiently may help a mobile station maintain continuous reception, so as to prevent dropped calls, for example. Additionally, achieving these ends in an efficient manner may reduce power consumption as well as save time. Embodiments described herein may help achieve any and all of these benefits.

Figure 1:
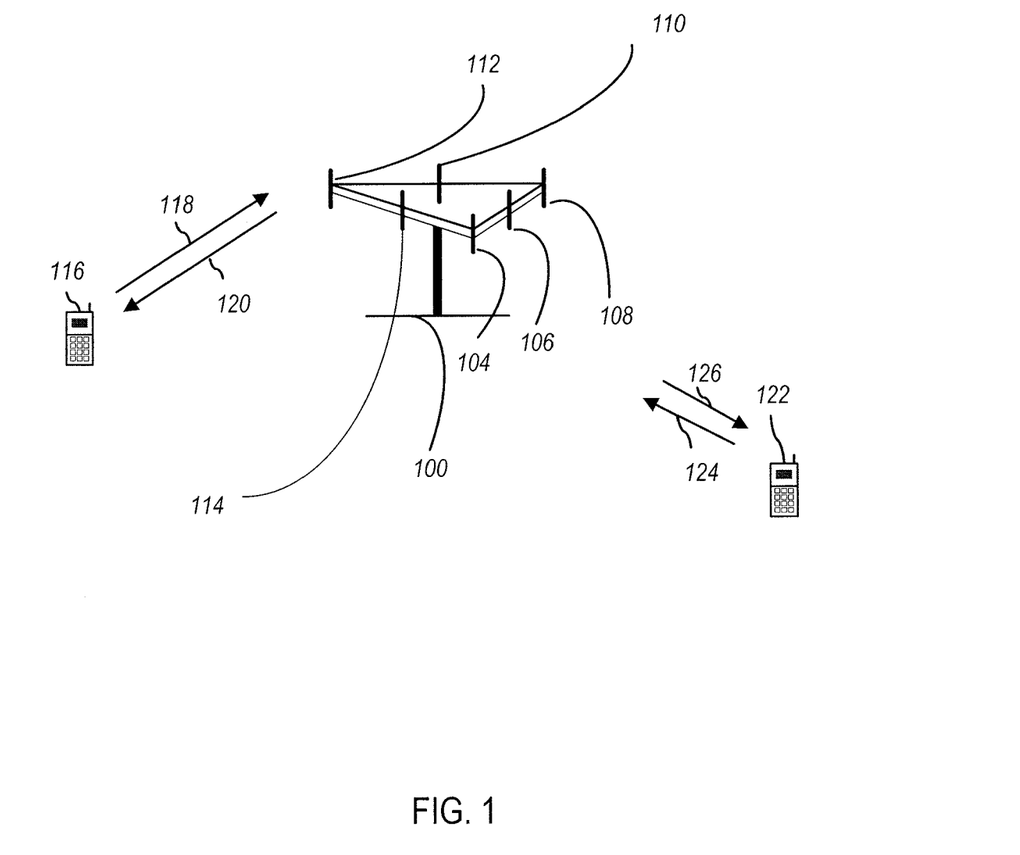
FIG. 1 is an example multiple access wireless communication system according to some embodiments.

Referring to FIG. 1, a multiple access wireless communication system according to some embodiments is illustrated. An access point (AP) 100 includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with AP 100 via antennas 112 and 114, where antennas 112 and 114 transmit signals to access terminal 116 over forward link 120 and receive signals from access terminal 116 over reverse link 118. Access terminal 122 is in communication with AP 100 via antennas 106 and 108, where antennas 106 and 108 transmit signals to access terminal 122 over forward link 126 and receive signals from access terminal 122 over reverse link 124. In a Frequency Division Duplex (FDD) system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In some embodiments, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
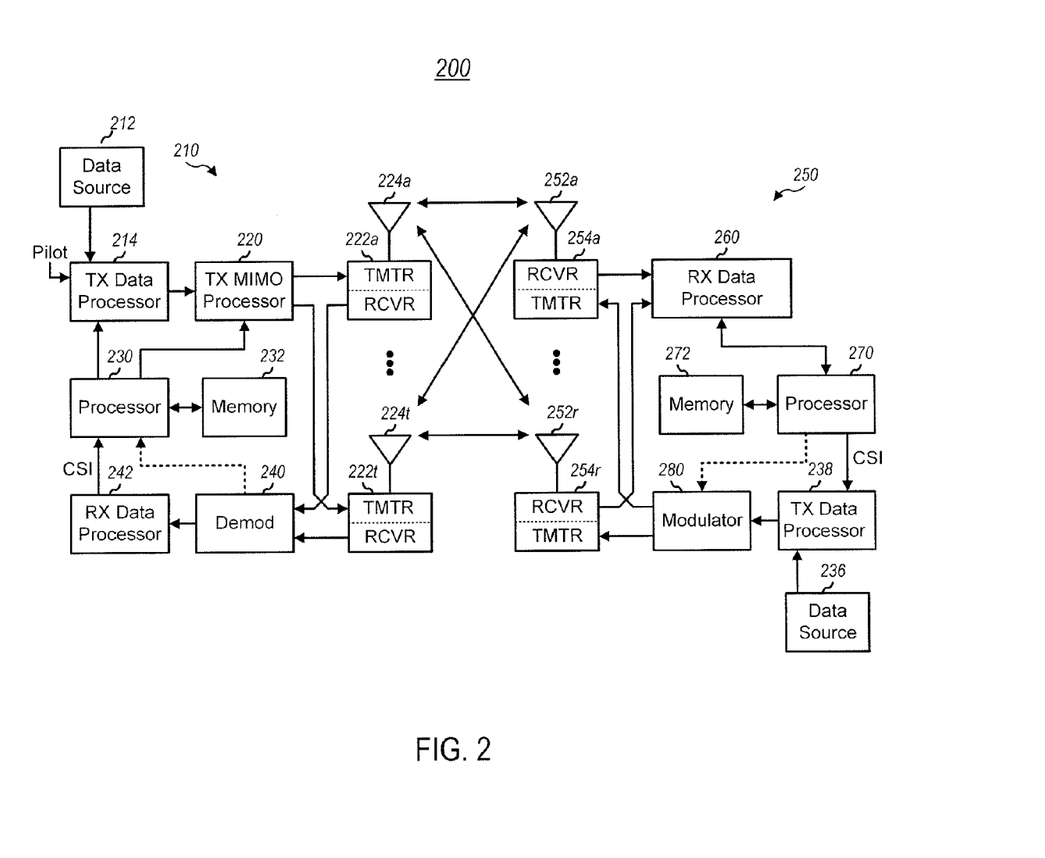
FIG. 2 is an example wireless communications interface including a transmitter system and a receiver system according to some embodiments.

FIG. 2 is a block diagram of an embodiment of a transmitter system 210 of an access point and a receiver system 250 of an access terminal in a multiple-input and multiple-output (MIMO) system 200. At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t, where NT is a positive integer associated with transmitters described in FIG. 2. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r, where NR is a positive integer associated with receivers described in FIG. 2. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 stores the various pre-coding matrices that are used by processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message. Processor 230 obtains the pre-coding matrices from memory 232, which stores various pre-coding matrices. Memory 232 may also contain other types of data, such as information databases and locally and globally unique attributes of multiple base stations.

Figure 3:
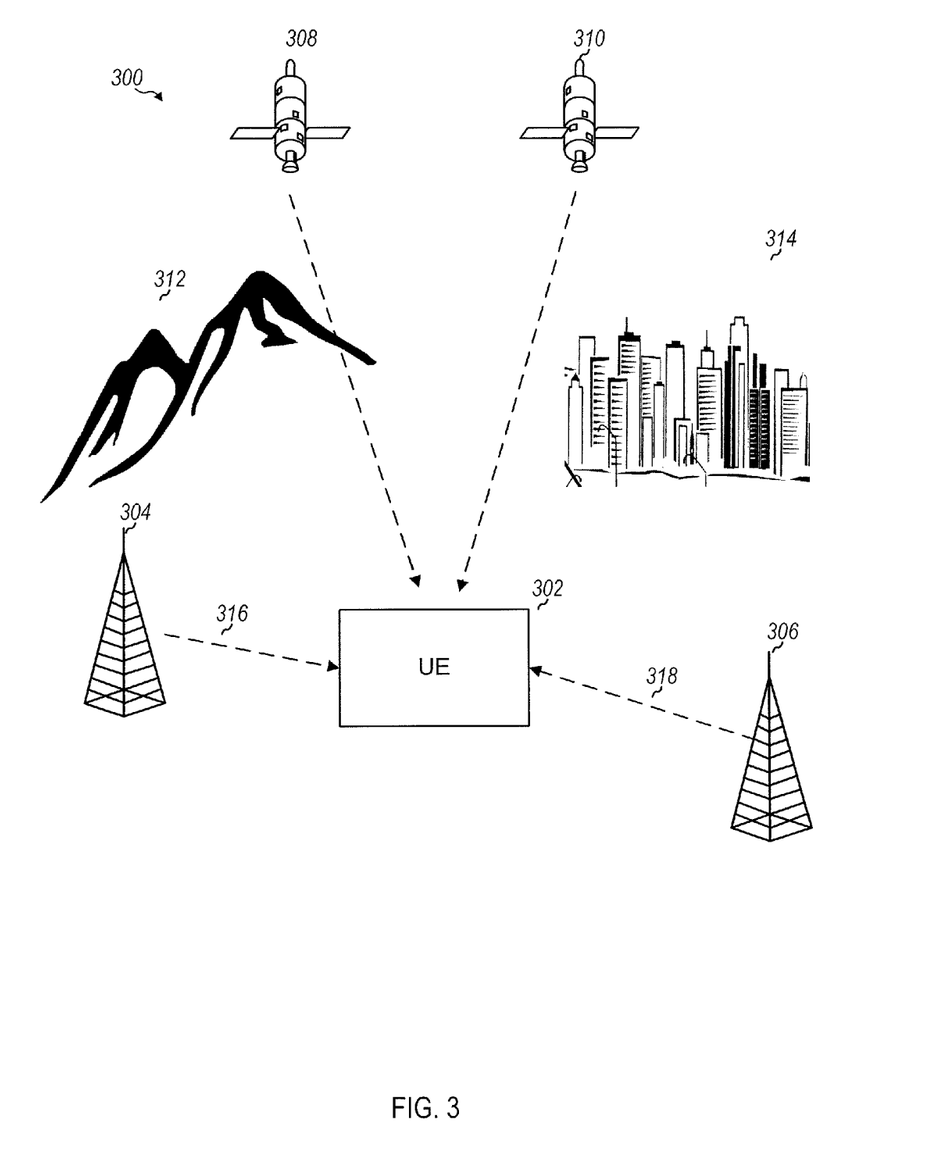
FIG. 3 is an example wireless communications environment of a user equipment (UE) according to some embodiments.

Referring to FIG. 3, in some embodiments, a user equipment (UE) 302 may operate within a wireless network environment 300. A UE 302 may refer to any apparatus used and/or operated by a user or consumer, such as a mobile device, cell phone, electronic tablet, touch screen device, radio, GPS device, etc. A UE or mobile station (e.g. a cell phone) 302 may attempt to determine its global position or access global positioning information for other purposes, utilizing satellites 308 and/or 310 to do so. The mobile station 302 may also rely on receiving data from nearby terrestrial base stations 304 and/or 306, not just satellites 308 and/or 310, particularly when the mobile station 302 has limited visibility to the sky and satellites 308 and/or 310 due to mountain ranges 312, tall buildings, 314, crowded areas, etc.

To improve the time needed to acquire position information from local base stations 304 or 306—and thus improve the time delay in determining the mobile station's 302 global position—the mobile station 302 may store in memory a globally unique identification number of each base station that the mobile station may typically use, e.g. base stations 304 and 306. This globally unique identification number may be referred to as the cell ID (CID) of a base station. Each base station in the world has a unique CID, thereby allowing a mobile station 302 to identify exactly which base station is being accessed just by knowing the CID. Remembering the CIDs of often-used base stations, e.g. 304 and 306, allows the mobile station 302 to easily acquire signals of those base stations 304 and 306, reducing the time spent exhaustively searching for base station signals. Base stations may typically transmit their CID automatically, as part of header information broadcasted so that any UE 302 within range has an opportunity to receive the information. In this case, UE 302 may receive the globally unique CID of base station 304 via wireless signal 316, and UE 302 may receive the globally unique CID of base station 306 via wireless signal 318.

Figure 4:
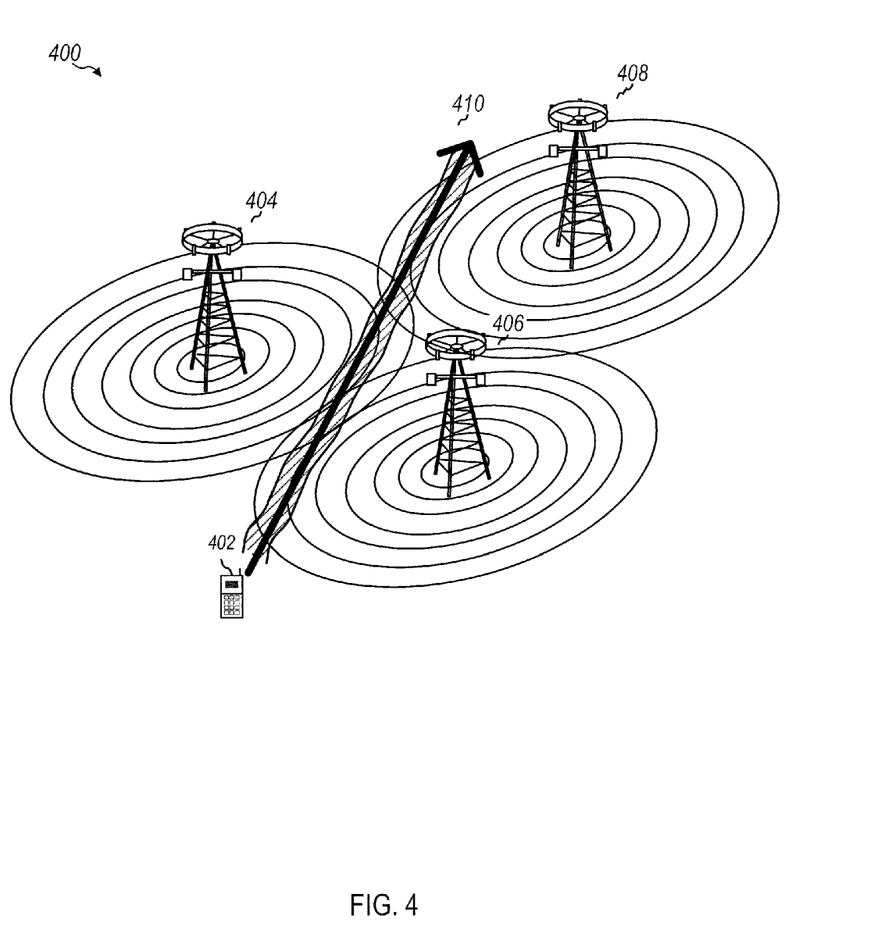
FIG. 4 is an example scenario of a mobile station traveling through the ranges of multiple base stations according to some embodiments.

However, referring to FIG. 4, some wireless communications environments (e.g. air interfaces, e.g. TD-SCDMA, UMTS-FDD, LTE, CDMA, etc.), which govern the types and format of data capable of being sent between mobile stations and base stations, do not require the CID to be transmitted to the mobile station in certain circumstances, such as when the mobile station experiences high traffic volume. This may be a problem particularly when a mobile station passes beyond the range of one base station into the range of another (e.g. handover situations) and thus needs to identify the next base station.

For example, in wireless environment 400, a mobile station 402 may travel through the ranges of various base stations 404, 406, and 408. The mobile station 402 may be travelling in a car or a train or through some other means. The rings around base stations 404, 406, and 408 indicate how far the base stations may be able to provide reception of their respective transmissions. The arrow 410 may indicate the path that mobile station 402 may travel, perhaps on a road or on train tracks or the like. As mobile station 402 travels along the path 410, it can be seen that mobile station 402 will pass through the range first of base station 406, fall out of range of base station 406 and into the range of base station 404. Then mobile station 402 will travel out of the range of base station 404 and into the range of base station 408.

The mobile station 402 may automatically seek access of another base station as it loses reception of a current base station. This process of switching from one base station to the next, e.g. the switching of base stations described above, may be referred to as "handovers." During handovers, the mobile station 402 may acquire information allowing it to determine a globally unique identification number of a local base station currently in range, such as the CID. However, in certain circumstances, e.g. high traffic volume situations, some wireless communications environments, such as TD-SCDMA and UMTS-FDD, may not require the CID to be received by the mobile device. Thus, the CID of a new base station may not be identified during handover situations, e.g. when traveling along path 410, when mobile station 402 is used in a high traffic volume situation. If the CID is not identified due to heavy traffic or for other reasons, then the mobile station 402 cannot rely on the CID to identify the next base station and according to conventional means must instead perform an exhaustive search to find the next base station, causing significant time delay and loss in energy resources. It may be desirable then to have an alternate method for quickly acquiring base stations when a mobile station 402 crosses between base station boundaries.

Figure 5A:
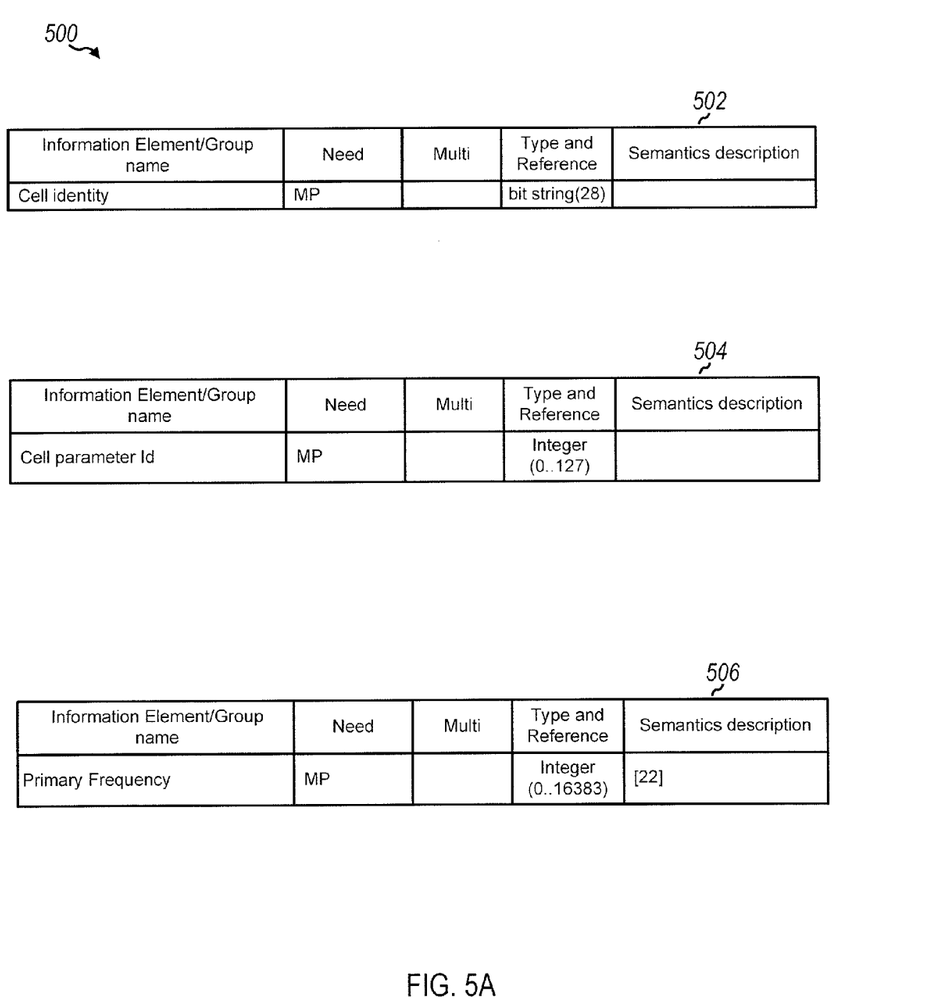
FIG. 5A shows exemplary message formats according to some embodiments.

Referring to FIG. 5A, according to some embodiments however, a mobile station may receive two other pieces of data, e.g. a first locally unique base station identification sometimes called a midamble index or cell parameter ID (CPID) and a second locally unique base station identification sometimes called a cell frequency parameter or primary frequency (PF), in order to determine what base stations are near to the mobile station when the mobile station does not receive the globally unique CID from the nearby base station. This general technique may be especially useful in air interfaces such as TD-SCDMA and UMTS-FDD, standards which may not require a CID to be transmitted to the mobile station during traffic.

Diagram 500 may illustrate example message formats and descriptions of a globally unique attribute 502, e.g. a Cell Identity or CID, a first locally unique attribute 504, e.g. a midamble index or cell parameter ID (CPID), and a second locally unique attribute 506, e.g. a primary frequency (PF) of a base station. The CID may be considered a globally unique attribute because each base station in the world is labeled with a unique CID, such that any particular CID unambiguously refers to only one base station in the world. A CPID and a PF together may be considered locally unique attributes of a base station because the values of a CPID and PF may repeat for other base stations, such that values of a CPID and PF may only help identify base stations in a local area.

Exemplary CID format 502 may show some attributes of a CID, and by extension a globally unique attribute according to some embodiments. Here, the format of a CID may be a bit string of 28 characters. In some embodiments, a character may be any number or letter. In other embodiments, a character may be a hexadecimal value. The format may be globally unique in that no CID value is the same, and thus a match of a CID may signal an identification of that particular base station belonging to that particular CID.

Exemplary CPID format 504 may show a format for a locally unique attribute having integer values ranging only from 0 to 127. It may be known, therefore, that base stations having a particular CPID value may have overlapping matches to other base stations, since there are many more than just 128 base stations installed around the world.

Exemplary PF format 506 may show a format for another locally unique attribute having integer values ranging from 0 to 16383. Here, given that there is a greater range of values than exemplary format 504, the combination of the both values, as a first locally unique attribute and a second locally unique attribute, may help to more definitively determine a base station even without receiving the globally unique attribute.

Figure 5B:
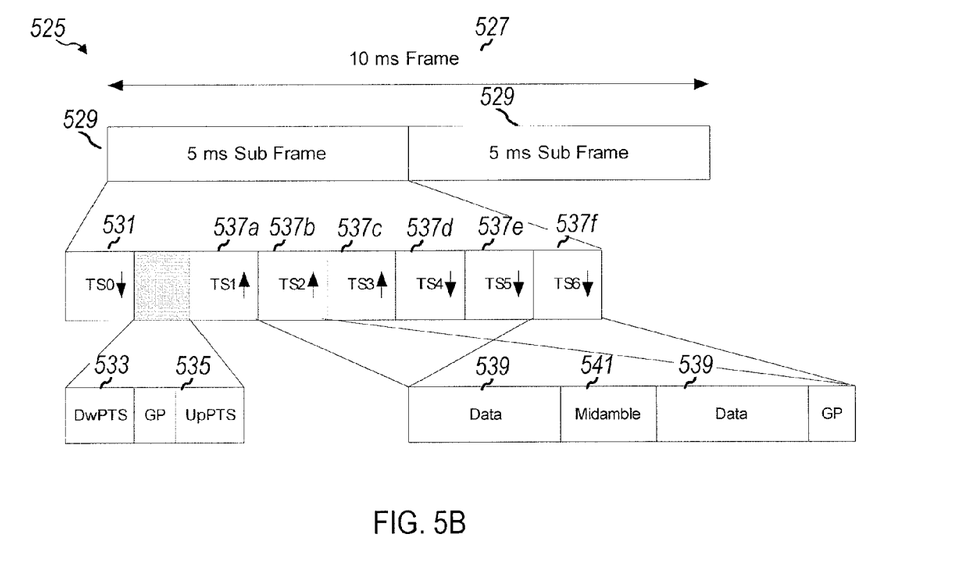
FIG. 5B shows other exemplary message formats according to some embodiments.

Referring to FIG. 5B, exemplary message format 525 may illustrate where in a data stream the global and local unique attributes may be found. A signal received by a mobile device in an air interface may be divided into 10 millisecond (ms) frames 527. Within each frame 527, there may be two 5 ms sub frames 529. Within each subframe, there may be 7 time slots (TSs), each TS containing a specific set of information organized in a particular pattern, with an $8^{th}$ time slot used to contain information organized in a completely different pattern. Here, TS0 531 may contain downlink information, as signified by the arrow pointing down. Downlink information may be information received by a mobile station that is transmitted from a base station. TS0 531 may contain a globally unique attribute, such as a CID, and a locally unique attribute, such as a PF, in some embodiments. The next time slot may not be consistent with similar patterns of the other time slots, and may contain a downlink pilot slot (DwPTS) 533, a gap (GP), and an uplink pilot slot (UpPTS) 535. Uplink may refer to information transmitted by the mobile station that is received at a base station. The next six time slots 537*a* through 537*f* may contain either downlink (DL) information or uplink (UL) information. In this example, three TSs 537*a*, 537*b*, and 537*c*, are designated for UL, and three TSs 537*d*, 537*e*, and 537*f*, are designated for DL. Each of these TSs may be subdivided according to the same message format as shown. For example, the TS may contain a data payload portion 539, followed by a midamble index 541, followed by another data portion 539, and then a gap. In some embodiments, a TS may repeat the aforementioned format 16 times. This format may repeat for each of the TSs 537*a* through 537*f*. The midamble index 541 may be a locally unique attribute of the base station transmitting such information. The descriptions of FIG. 5B may be consistent with at least some air interfaces known in the art, such as TD-SCDMA. In other embodiments, other message formats may be used according to other air interfaces known in the art, and embodiments are not so limited.

Figure 5C:
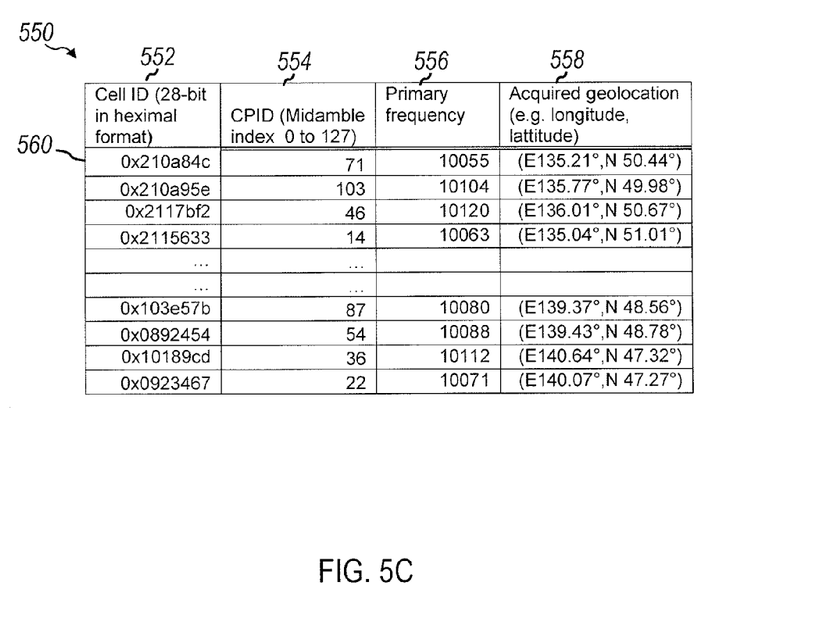
FIG. 5C is an example database of some embodiments.

Referring to FIG. 5C, an exemplary database 550 to store the globally unique attribute and first and second locally unique attributes of base stations is described according to some embodiments. Database 550 may contain at least three database items per entry, one item for each of the globally unique attribute 552, and first and second locally unique attributes, 554 and 556, respectively. In some embodiments, other entries may exist, such as a geographic location entry 558. Database 550 may be stored in memory of a mobile device, such as mobile device 402, UE 302, mobile station 116, mobile station 122, or access terminal 250. A mobile device storing database 550 may be configured to update database 550 whenever a new base station, or a different attribute of the base station, is received. The mobile device may obtain the information to populate the data 550 from signals received consistent with message format 525 and formats 502, 504, and 506, for example. For example, base station entry 560 shows 4 entries: CID value 0x210a84c, CPID value 71, PF value 10055, and geographic location (E135.21°,N 50.44°). Thus, if the mobile device receives just the CPID and PF values, the location of the base station and/or the CID value may be identified by referring to the entries in the same row.

In some embodiments, a database like exemplary database 550 may be updated in the following manner: 1. Receive CID information from a base station. The information may be obtained within signals consistent with message format 525 or other similar formats. 2. Receive CPID and PF info from same base station, through format 525 or other similar message formats. 3. Update all entries for this base station. The entries may be updated in a database 550 or something similar. Thus the globally unique value is associated with two locally unique values. 4. Continue to update values of any whenever new info is received. 5. Check against current info found in signals received from base stations to see if values need updating.

In some embodiments, the database may contain "triplets" of data, including a CID, PF, and CPID of a base station, in an exemplary format $\{CID_i, PF_i, CPID_i\}$, where i is an index of a base station. In some cases, embodiments that attempt to refer to and/or update database 550 may not receive all the information in the triplet. For example, the mobile device containing database 550 may be in dedicated traffic mode while in some wireless environments, e.g. TD-SCDMA or UMTS-FDD, and thus may not receive a globally unique attribute, e.g. a CID, when in contact with a local base station. In such cases, the database 550 may not be fully updated, and additionally the identity of a local base station may be inferred using pre-existing information in the database 550.

As noted previously, a difference between conventional techniques and techniques of some embodiments may be that the CPID and PF are not globally unique values for base stations; they are only locally unique, meaning that the CPID and PF values may be repeated for other base stations in other locations. Therefore, a database, e.g. database 550, storing CPID 554 and PF 556 values may be refreshed periodically in the case that some database items repeat local attributes or some of the information becomes inaccurate. To refresh the database, some embodiments may purge some or all entries in order to create space for fresh data. A complete purge of data may be beneficial when the mobile station is activated in a completely different geographic location than previously. For example, a user of the mobile station may go on vacation to another continent, and may still use the same mobile station. The user may then be in proximity to a completely different set of base stations having different locally unique attributes as well as different globally unique attributes.

Figure 6:
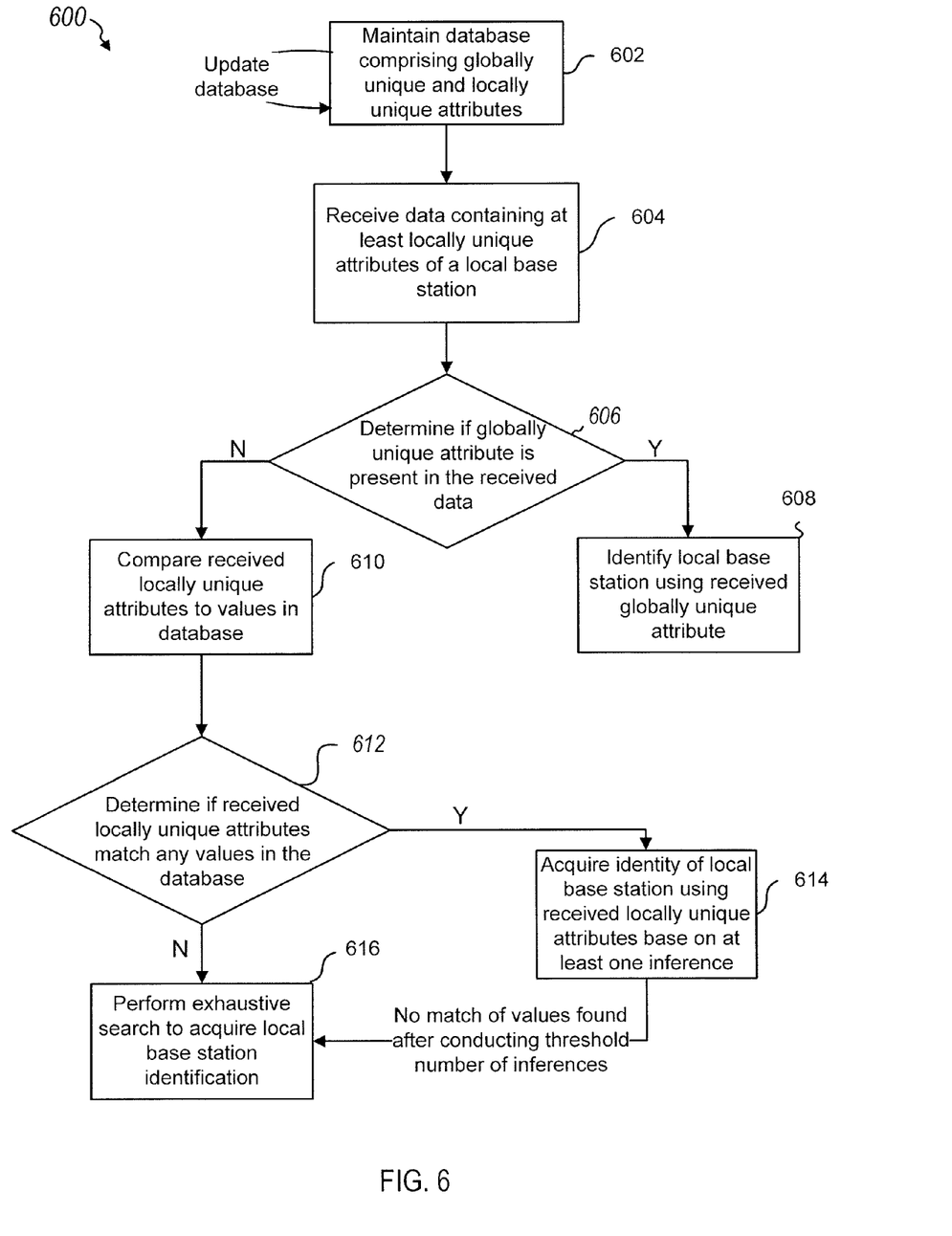
FIG. 6 is an exemplary flowchart showing methods of some embodiments.

Referring to FIG. 6, flowchart 600 represents an exemplary methodology according to some embodiments. Starting at block 602, a database may be maintained, the database may contain data of base stations, including a globally unique attribute and at least one locally unique attribute of each base station. In some embodiments, the database may contain a globally unique attribute, a first locally unique attribute and a second locally unique attribute for each base station entry. In some embodiments, the database may contain triplets of data, for example a CID, PF, and CPID of a base station, in an exemplary format $\{CID_i, PF_i, CPID_i\}$, where i is an index of a base station.

The database may be consistent with the exemplary database described in FIG. 5B, but certainly other databases may be maintained. Maintaining the database may involve updating values or entries of the database when any globally unique or locally unique attributes are received, including for example, CID, PF, and/or CPID values. Maintaining the database may also involve refreshing and/or purging the database when values are inaccurate and/or too old. As previously mentioned, certain values, such as the PF and CPID values, may be viewed as locally unique attributes of local base stations, and thus may change periodically depending on the location of the mobile station containing the database or for other reasons. Updating and/or refreshing the database may be consistent with any of the techniques described herein.

At block 604, data may be received, the data may contain at least one locally unique attribute of a base station. The data may be in reference to a nearby base station that is within range of a mobile station containing the database. The data may also contain more than just the at least one locally unique attribute. For example, the data may contain a globally unique attribute of the base station, a first locally unique attribute and a second locally unique attribute of the base station. In other cases, the data may include any of the data described in FIG. 5A. Prior to block 604, a request may also be initiated to receive such data, the request being directed to nearby base stations that are in range. In some embodiments the PF and CPID values of a local base station may be received. In some embodiments, CID values from the local base station may also be received. In some cases, a globally unique value may not be received, because a mobile device according to some embodiments may be operating in a high traffic volume state and may be in a wireless communications network that does not allow the globally unique value to be received while in the high traffic volume state. For example, a mobile device performing the methods described herein may be operating in accordance with a SC-TDMA or UMTS-FDD environment.

At block 606, it may be determined if a globally unique value is present in the received data from block 604. As previously mentioned, in some cases a globally unique value may not be present in the received data because embodiments may be operating in a state that does not receive the globally unique values in some circumstances. For example, the globally unique value may not be received at a mobile station while in an SC-TDMA or UMTS-FDD environment when the mobile device is in a high traffic volume state, e.g. placing a call. In some embodiments, it may be determined whether the CID of a local base station is present in the received data.

Determining whether a globally unique attribute is present in the received data may be beneficial in cases where a mobile station needs to or desires to obtain the identity of a local base station. This may be useful in a variety of cases, one example being when a mobile station needs to switch reception from one local base station to another in a handover situation. Such handovers may be consistent with the scenario described in FIG. 4.

At block 608, if it is determined that the globally unique attribute of a local base station is present in the received data, then embodiments may be able to determine the identity of the local base using conventional techniques. For example, if it is determined that the CID of a local base station is present in the received data, the local base station may be identified using the CID. This may be possible because a CID value is associated with only one base station in the entire world, and thus the base station may be accurately identified after knowing the CID value.

At block 610, if it is determined at block 606 that a globally unique attribute is not present in the received data, then the mobile device may identify a local base station based on the received locally unique attributes. The received locally unique attributes may be compared with values in the database. For example, the received PF and PCID values may be compared to the reference PF and PCID values in the database.

At block 612, it may then be determined if the received locally unique attributes match any values in the database. Since the database may be a collection of base station attributes most commonly used or more recently used, it may be likely the received locally unique attributes match some of the database values. For example, if a mobile station travels around one city most of the time, then the same local base stations around the city may be used most often. Therefore, if locally and globally unique attributes of these base stations are stored in the database, then there is a better chance that received locally unique attributes may be associated with one of the commonly used base stations around the city. Thus, even if the globally unique attribute is not received, the nearest base station needed to participate in handover situations may still be determined.

At block 614, if the locally unique attributes match values in the database, the identity of the local base station from where the data came from may be acquired, using the received locally unique attributes. At least one inference may be made to determine which local base station the data came from. For example, if the received first and second locally unique attributes match values in the same row k of the database, then it may be inferred that the local base station is the base station associated with the CID of row k.

In other cases, the first received locally unique attribute may match a value in row m of the database, while the second received locally unique attribute may match a value in row n of the database. Here, additional inferences may need to be made in order to determine the identity of the local base station. In this case, the database may be further updated to determine what the first and second locally unique attributes should be in both rows m and n. In some cases, error checking may be performed to see if locally unique attributes are mismatched and adjust accordingly.

Similarly, a number of inferences may be made to determine the identity of the local base station using at least the locally unique attributes. Other kinds of data, either existing in the database or from the received data, may be used to find various connections to help conclude what the local base station may be. For example, the inferences may be based on the received PF and/or CPID values. additional mapping may be used, where knowledge of the location of one recently used base station narrows the possibilities of the next used base station, based on proximity to the recently used base station. This knowledge may be combined with knowledge of the received PF and/or CPID values and a determination may be made as to what is likely to be the local base station. Similarly, these connections could be PF and CPID values that suggest nearby base stations, the locations of which could suggest other nearby stations, and so on until a CID value for the local base station may be determined. For example, referring to FIG. 5C, if a user started a call on a mobile device in range of a base station with CPID of 71 and PF 10055 (71, 10055), and the call is handed over to (103, 10104), a globally unique ID 0x210a95e can be inferred.

Because inferences may be made almost an unlimited number of times, the chain or number of inferences may be "cut off" or stopped by some threshold criteria. For example, a maximum number of inferences to be made may be specified. If a determination of the local base station cannot be made by the set number of threshold inferences, then it may be determined that no match may be found.

At block 616, if it is determined that no values in the database match the received locally unique attributes from block 612, or that no match in the database is found after conducting the maximum number of inferences from block 614, then embodiments may perform an exhaustive search to identify the local base station. Performing the exhaustive search may be consistent with conventional techniques for searching for terrestrial base stations, which may consume more power and time than through other means provided in this disclosure.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 7:
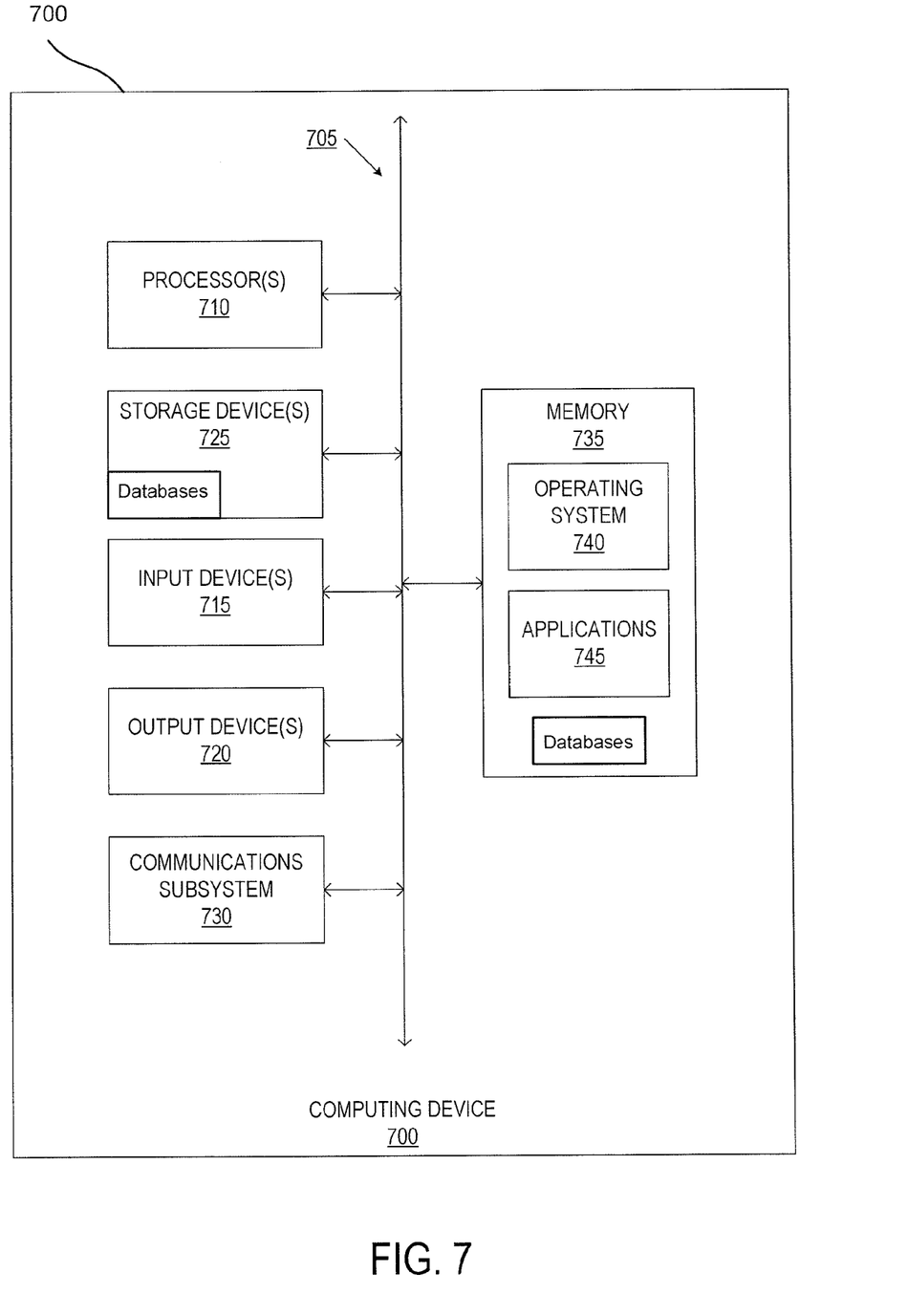
FIG. 7 is an example computer system according to some embodiments.

Having described multiple aspects of improving signal acquisition time of a base station, an example of a computing system in which various aspects of the disclosure may be implemented will now be described with respect to FIG. 7. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 700 is configured to implement any of the methods described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, wireless receivers, wireless sensors, a mouse, a keyboard and/or the like; and one or more output devices 720, which can include without limitation a display unit, a printer and/or the like. In some embodiments, the one or more processor 710 may be configured to perform a subset or all of the functions described above with respect to FIG. 6. The processor 710 may comprise a general processor and/or and application processor, for example. In some embodiments, the processor is integrated into an element that processes visual tracking device inputs and wireless sensor inputs.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 6, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example methods described with respect to FIG. 6.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710. Memory 735 may contain at least one database according to any of the databases and methods described herein. Memory 735 may thus store any of the values discussed in any of the present disclosures, including FIGS. 5C and 6 and related descriptions.

The methods described in FIG. 6 may be implemented by various blocks in FIG. 7. For example, processor 710 may be configured to perform any of the functions of blocks in diagram 600. Storage device 725 may be configured to store an intermediate result, such as a globally unique attribute or locally unique attribute discussed within any of blocks mentioned herein. Storage device 725 may also contain a database consistent with any of the present disclosures. The memory 735 may similarly be configured to record signals, representation of signals, or database values necessary to perform any of the functions described in any of the blocks mentioned herein. Results that may need to be stored in a temporary or volatile memory, such as RAM, may also be included in memory 735, and may include any intermediate result similar to what may be stored in storage device 725. Input device 715 may be configured to receive wireless signals from satellites and/or base stations according to the present disclosures described herein. Output device 720 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for improving time to acquire an identity of a base station by a mobile station, the method comprising:
   requesting data containing a globally unique attribute of the base station, a first locally unique attribute of the base station, and a second locally unique attribute of the base station;
   receiving data in response to the request, the data containing at least the first locally unique attribute and the second locally unique attribute, wherein the first locally unique attribute is a midamble index present in a time slot of a subframe, the midamble index being present between two data payload portions within the time slot of the subframe;
   determining that the data did not contain the globally unique attribute; and
   acquiring the identity of the base station based at least in part on the first locally unique attribute and the second locally unique attribute.

2. The method of claim 1, further comprising:
   comparing the first locally unique attribute and second locally unique attribute to values in a database, wherein the database contains a plurality of items, and each of the plurality of items contains a triplet of data related to a reference base station.

3. The method of claim 2, wherein the triplet of data contains a reference globally unique attribute, a first reference locally unique attribute, and a second reference locally unique attribute, wherein the reference globally unique attribute, the first reference locally unique attribute, and the second reference locally unique attribute are associated with the reference base station.

4. The method of claim 2, further comprising:
   purging the database of items that have remained in the database a predetermined length of time; and
   updating the database of current items related to base stations in geographic proximity to the mobile station.

5. The method of claim 1, wherein the globally unique attribute of the base station comprises a cell ID of the base station, the first locally unique attribute of the base station comprises a cell parameter ID of the base station, and the second locally unique attribute of the base station comprises a primary frequency of the base station.

6. The method of claim 1, wherein the mobile station operates in accordance with a TD-SCDMA or a UMTS-FDD environment.

7. The method of claim 1, further comprising performing at least one inference to determine the value of the globally unique attribute based on the first locally unique attribute or the second locally unique attribute.

8. The method of claim 7, wherein performing the at least one inference further comprises performing additional inferences, wherein the number of additional inferences is limited based on at least one predetermined criterion.

9. An apparatus configured to improve signal acquisition time of a base station, comprising:
   a transmitter configured to request data containing a globally unique attribute of a base station, a first locally unique attribute of the base station, and a second locally unique attribute of the base station;
   a receiver configured to receive data in response to the request, the data containing at least the first locally unique attribute and the second locally unique attribute, wherein the first locally unique attribute is a midamble index present in a time slot of a subframe, the midamble index being present between two data payload portions within the time slot of the subframe; and
   a processor configured to:
      determine that the data did not contain the globally unique attribute; and
      acquire an identity of the base station based at least in part on the first locally unique attribute and the second locally unique attribute.

10. The apparatus of claim 9, wherein the processor is further configured to compare the first locally unique attribute and second locally unique attribute to values in a database, wherein the database contains a plurality of items, and each of the plurality of items contains a triplet of data related to a reference base station.

11. The apparatus of claim 10, wherein the triplet of data contains a reference globally unique attribute, a first reference locally unique attribute, and a second reference locally unique attribute, wherein the reference globally unique attribute, the first reference locally unique attribute, and the second reference locally unique attribute are associated with the reference base station.

12. The apparatus of claim 10, wherein the processor is further configured to:
   purge the database of items that have remained in the database a predetermined length of time; and
   update the database of current items related to base stations in geographic proximity to the mobile station.

13. The apparatus of claim 9, wherein the globally unique attribute of the base station comprises a cell ID of the base station, the first locally unique attribute of the base station comprises a cell parameter ID of the base station, and the second locally unique attribute of the base station comprises a primary frequency of the base station.

14. The apparatus of claim 9, wherein the mobile station operates in accordance with a TD-SCDMA or a UMTS-FDD environment.

15. The apparatus of claim 9, wherein the processor is further configured to perform at least one inference to determine the value of the globally unique attribute based on the first locally unique attribute or the second locally unique attribute.

16. The apparatus of claim 15, wherein the processor is further configured to perform additional inferences, wherein the number of additional inferences is limited based on at least one predetermined criterion.

17. An apparatus configured to improve signal acquisition time of a base station, comprising:
    means for requesting data containing a globally unique attribute of a base station, a first locally unique attribute of the base station, and a second locally unique attribute of the base station;
    means for receiving data in response to the request, the data containing at least the first locally unique attribute and the second locally unique attribute, wherein the first locally unique attribute is a midamble index present in a time slot of a subframe, the midamble index being present between two data payload portions within the time slot of the subframe;
    means for determining that the data did not contain the globally unique attribute; and
    means for acquiring an identity of the base station based at least in part on the first locally unique attribute and the second locally unique attribute.

18. The apparatus of claim 17, further comprising means for comparing the first locally unique attribute and second locally unique attribute to values in a database, wherein the database contains a plurality of items, and each of the plurality of items contains a triplet of data related to a reference base station.

19. The apparatus of claim 18, wherein the triplet of data contains a reference globally unique attribute, a first reference locally unique attribute, and a second reference locally unique attribute, wherein the reference globally unique attribute, the first reference locally unique attribute, and the second reference locally unique attribute are associated with the reference base station.

20. The apparatus of claim 18, further comprising:
    means for purging the database of items that have remained in the database a predetermined length of time; and
    means for updating the database of current items related to base stations in geographic proximity to the mobile station.

21. The apparatus of claim 17, wherein the globally unique attribute of the base station comprises a cell ID of the base station, the first locally unique attribute of the base station comprises a cell parameter ID of the base station, and the second locally unique attribute of the base station comprises a primary frequency of the base station.

22. The apparatus of claim 17, wherein the mobile station operates in accordance with a TD-SCDMA or a UMTS-FDD environment.

23. The apparatus of claim 17, further comprising means for performing at least one inference to determine the value of the globally unique attribute based on the first locally unique attribute or the second locally unique attribute.

24. The apparatus of claim 23, wherein the means for performing at least one inference further comprises means for performing additional inferences, wherein the number of additional inferences is limited based on at least one predetermined criterion.

25. A computer program product residing on a non-transitory processor-readable medium and comprising processor-readable instructions configured to cause a processor to:
    request data containing a globally unique attribute of a base station, a first locally unique attribute of the base station, and a second locally unique attribute of the base station;
    receive data in response to the request, the data containing at least the first locally unique attribute and the second locally unique attribute, wherein the first locally unique attribute is a midamble index present in a time slot of a subframe, the midamble index being present between two data payload portions within the time slot of the subframe;
    determine that the data did not contain the globally unique attribute; and
    acquire an identity of the base station based at least in part on the first locally unique attribute and the second locally unique attribute.

26. The computer program product of claim 25, wherein the processor-readable instructions further cause the processor to compare the first locally unique attribute and second locally unique attribute to values in a database, wherein the database contains a plurality of items, and each of the plurality of items contains a triplet of data related to a reference base station.

27. The computer program product of claim 26, wherein the triplet of data contains a reference globally unique attribute, a first reference locally unique attribute, and a second reference locally unique attribute, wherein the reference globally unique attribute, the first reference locally unique attribute, and the second reference locally unique attribute are associated with the reference base station.

28. The computer program product of claim 26, wherein the processor-readable instructions further cause the processor to:
    purge the database of items that have remained in the database a predetermined length of time; and
    update the database of current items related to base stations in geographic proximity to the mobile station.

29. The computer program product of claim 25, wherein the globally unique attribute of the base station comprises a cell ID of the base station, the first locally unique attribute of the base station comprises a cell parameter ID of the base station, and the second locally unique attribute of the base station comprises a primary frequency of the base station.

30. The computer program product of claim 25, wherein the mobile station operates in accordance with a TD-SCDMA or a UMTS-FDD environment.

31. The computer program product of claim 25, wherein the processor-readable instructions further cause the processor to perform at least one inference to determine the value of the globally unique attribute based on the first locally unique attribute or the second locally unique attribute.

32. The computer program product of claim 31, wherein the processor-readable instructions further cause the processor to perform additional inferences, wherein the number of additional inferences is limited based on at least one predetermined criterion.

* * * * *